United States Patent
Jiang et al.

(10) Patent No.: US 11,689,713 B2
(45) Date of Patent: Jun. 27, 2023

(54) PREDICTED FRAME GENERATION BY DEFORMABLE CONVOLUTION FOR VIDEO CODING

(71) Applicant: TENCENT AMERICA LLC, Palo Alto, CA (US)

(72) Inventors: Wei Jiang, San Jose, CA (US); Wei Wang, Palo Alto, CA (US); Ding Ding, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 6 days.

(21) Appl. No.: 17/319,932

(22) Filed: May 13, 2021

(65) Prior Publication Data
US 2022/0021870 A1    Jan. 20, 2022

Related U.S. Application Data

(60) Provisional application No. 63/052,231, filed on Jul. 15, 2020.

(51) Int. Cl.
*H04N 19/105* (2014.01)
*G06N 3/084* (2023.01)
*G06T 9/00* (2006.01)
*H04N 19/172* (2014.01)
*G06F 18/25* (2023.01)

(52) U.S. Cl.
CPC ......... *H04N 19/105* (2014.11); *G06F 18/253* (2023.01); *G06N 3/084* (2013.01); *G06T 9/002* (2013.01); *H04N 19/172* (2014.11)

(58) Field of Classification Search
CPC .... H04N 19/105; H04N 19/172; G06K 9/629; G06N 3/084; G06T 9/002
USPC ..................................... 375/240.12
See application file for complete search history.

(56) References Cited

U.S. PATENT DOCUMENTS

| | | |
|---|---|---|
| 10,713,493 B1 | 7/2020 | Huang et al. |
| 2006/0250520 A1 | 11/2006 | Han et al. |
| 2019/0124346 A1 | 4/2019 | Ren et al. |
| 2019/0246102 A1 | 8/2019 | Cho et al. |

(Continued)

OTHER PUBLICATIONS

Hyomin Choi, et al., Deep Frame Prediction for Video Coding, Copyright © 2019 IEEE, arXiv:1901.00062v3 [eess.IV] Jun. 20, 2019, 13 pgs.

(Continued)

*Primary Examiner* — Allen C Wong
(74) *Attorney, Agent, or Firm* — ArentFox Schiff LLP

(57) ABSTRACT

A method of video coding at a video coding device includes performing a deformable convolution through a deformable convolutional deep neural network (DNN) to generate one or more first feature maps based on a set of one or more previously reconstructed reference frames, generating a predicted frame based on the one or more first feature maps, and reconstructing a current frame based on the predicted frame. In an embodiment, a set of one or more second feature maps corresponding to the one or more previously reconstructed reference frames can be generated based on a feature extraction DNN. One or more offset maps corresponding to the one or more second feature maps can be generated, respectively, using an offset generation DNN.

20 Claims, 7 Drawing Sheets

(56) References Cited

U.S. PATENT DOCUMENTS

2020/0202601 A1 6/2020 Lin et al.
2021/0160522 A1* 5/2021 Lee .................... G06T 9/002
2021/0327033 A1* 10/2021 Xu ........................ H04N 5/21

OTHER PUBLICATIONS

Ren Yang, et al., Learning for Video Compression with Hierarchical Quality and Recurrent Enhancement, arXiv:2003.01966v6 [eess.IV] Apr. 8, 2020, 14 pgs.
International Search Report and Written Opinion dated Sep. 10, 2021 in International PCT No. PCT/US 21/36764, 7 pgs.
Supplementary European Search Report dated Oct. 28, 2022 in Application No. 21841471.2, pp. 1-13.
Deng Jianing et al: "Spatio-Temporal Deformable Convolution for Compressed Video Quality Enhancement", Proceedings of the AAAI Conference on Artificial Intelligence, vol. 34, No. 07, Mar. 4, 2020 (Mar. 4, 2020), pp. 10696-10703.
Kuldeep Purohit et al: "Spatially-Adaptive Residual Networks for Efficient Image and Video Deblurring", ARXIV.ORG, Cornell University Library, 201 Olin Library Cornell University Ithaca, NY 14853, Mar. 25, 2019, pp. 1-10.
Jifeng Dai et al: "Deformable Convolutional Networks", ARXIV. ORG, Cornell University Library, 201 Olin Library Cornell University Ithaca, NY 14853, Mar. 17, 2017, pp. 1-11.
Wei Jiang et al: "[NNR] CE1: Data-dependent transformation for highly 3D pruned Neural Networks", 131. MPEG Meeting; Jun. 29, 2020-Jul. 3, 2020; Online; (Motion Picture Expert Group or ISO/IEC JTC1/SC29/WG11), No. m54481, Jun. 30, 2020, pp. 1-6.
Lee Jung-Kyung et al: "Deep Video Prediction Network-ased Inter-Frame Coding in HEVC", IEEE Access, IEEE, USA, vol. 8, May 8, 2020, pp. 95906-95917.
Tran, Du, et al. "Learning spatiotemporal features with 3d convolutional networks." in 2015 IEEE International Conference on Computer Vision (ICCV), Santiago, Chile, 2015, pp. 4489-4497.

* cited by examiner

PREDICTED FRAME GENERATION BY DEFORMABLE CONVOLUTION FOR VIDEO CODING

INCORPORATION BY REFERENCE

This present disclosure claims the benefit of priority to U.S. Provisional Application No. 63/052,231, "Predicted Frame Generation by Deformable Convolution" filed on Jul. 15, 2020, which is incorporated by reference herein in its entirety.

TECHNICAL FIELD

The present disclosure describes embodiments generally related to video coding based on artificial neural networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A neural network is based on a collection of connected nodes (also referred to as neurons), which loosely model the neurons in a biological brain. The neurons can be organized into multiple layers. Neurons of one layer can connect to neurons of the immediately preceding and immediately following layers.

A connection between two neurons, like the synapses in a biological brain, can transmit a signal from one neuron to the other neuron. A neuron that receives a signal then processes the signal and can signal other connected neurons. In some examples, to find the output of a neuron, inputs to the neuron are weighted by the weights of the connections from the inputs to the neuron, and the weighted inputs are summed to generate a weighted sum. A bias may be added to the weighted sum. Further, the weighted sum is then passed through an activation function to produce the output.

SUMMARY

Aspects of the disclosure provide a method of video coding at a video coding device. The method can include performing a deformable convolution through a deformable convolutional deep neural network (DNN) to generate one or more first feature maps based on a set of one or more previously reconstructed reference frames, generating a predicted frame based on the one or more first feature maps, and reconstructing a current frame based on the predicted frame.

In an embodiment, a set of one or more second feature maps corresponding to the one or more previously reconstructed reference frames can be generated based on a feature extraction DNN. One or more offset maps corresponding to the one or more second feature maps can be generated, respectively, using an offset generation DNN. Each offset map can be generated based on the following input to the offset generation DNN: the second feature map corresponding to the offset map being generated, and the second feature map corresponding to a target frame that is one of the one or more previously reconstructed reference frames. The one or more offset maps can have the same target frame.

In an embodiment, the target frame neighbors the current frame when the current frame and the one or more previously reconstructed reference frames are arranged in display order. In an embodiment, the target frame is the last frame of the one or more previously reconstructed reference frames when the current frame is a P frame. The target frame is the last frame of the frames, among the one or more previously reconstructed reference frames, that are prior to the current frame in display order when the current frame is a B frame.

In an embodiment, the one or more second feature maps can be received as an input to the deformable convolutional DNN. The one or more first feature maps corresponding to the one or more second feature maps can be generated, respectively. In an embodiment, the deformable convolution DNN includes one or more deformable convolution layers each associated with a deformable convolution kernel, and at one of the one or more deformable convolution layers, corresponding to each second feature map, a deformable convolution is performed based on the respective deformable convolution kernel and the offset map of the respective second feature map.

In an embodiment, one or more aligned frames can be constructed using a frame reconstruction DNN based on the one or more first feature maps and the one or more previously reconstructed reference frames. The predicted frame can be generated using a frame synthesis DNN based on the one or more aligned frames.

In an embodiment, the method can further include generating a four-dimensional (4D) feature tensor using a feature extraction DNN with an input of a 4D tensor formed by the set of the one or more previously reconstructed reference frames. Each frame can include a number of channels. In an embodiment, the 4D feature tensor can be received as an input to the deformable convolutional DNN. A fused aligned feature map can be generated.

In an embodiment, the deformable convolution DNN includes one or more 3D deformable convolution layers each associated with a 3D deformable convolution kernel and a 3D offset map, and a 3D deformable convolution is performed based on the respective 3D deformable convolution kernel and the respective 3D offset map at one of the one or more deformable convolution layers. In an embodiment, the method can further include generating the predicted frame using a frame reconstruction DNN with the fused aligned feature map as an input to the frame reconstruction DNN.

Aspects of the disclosure further provide a method of neural network training. The method can include inputting a set of reference frames to a predicted frame generation module to generate a predicted frame. The predicted frame generation module can include neural networks having parameters that are to be optimized. The neural networks can include a deformable convolutional DNN. A loss of a loss function can be determined. The loss function can include a compressive loss indicating a bitrate estimated based on a difference between the predicted frame and a ground-truth frame, and a reconstruction quality loss indicating a quality of the predicted frame with respect to the ground-truth frame. A back-propagation can be performed based on the loss of the loss function to update the parameters of the neural networks in the predicted frame generation module.

In an embodiment, the reference frames are selected from a sequence of frames in a video based on a temporal down-sampling operation, and a frame in the sequence of frames that is not selected by the down-sampling operation is used as the ground-truth frame.

In an embodiment, the loss function further includes an alignment loss indicating an alignment error. The training method can further include generating first feature maps corresponding to the reference frames, respectively, using a feature extraction deep neural network (DNN) in the predicted frame generation module, generating second feature maps corresponding to the first feature maps, respectively, using the deformable convolution DNN in the predicted frame generation module, and determining a difference between one of the second feature maps and the first feature map corresponding to a target frame that is one of the reference frames input to the predicted frame generation module. The difference is part of the alignment loss. In an embodiment, the target frame is the reference frame that neighbors the ground-truth frame when the ground-truth frame and the reference frames are arranged in display order.

In an embodiment, the method of neural network training can further include generating a residual signal between the ground-truth frame and the predicted frame, performing residual encoding and decoding subsequently to the residual signal to generate a reconstructed residual signal, combining the ground-truth frame with the reconstructed residual signal to generate a reconstructed reference frame, and including the reconstructed reference frame into the set of reference frames.

Aspects of the disclosure further provide a non-transitory computer-readable medium storing instructions that, when executed by a processor, cause the processor to perform the method of video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Temporal Deformable Convolution

Figure 1:
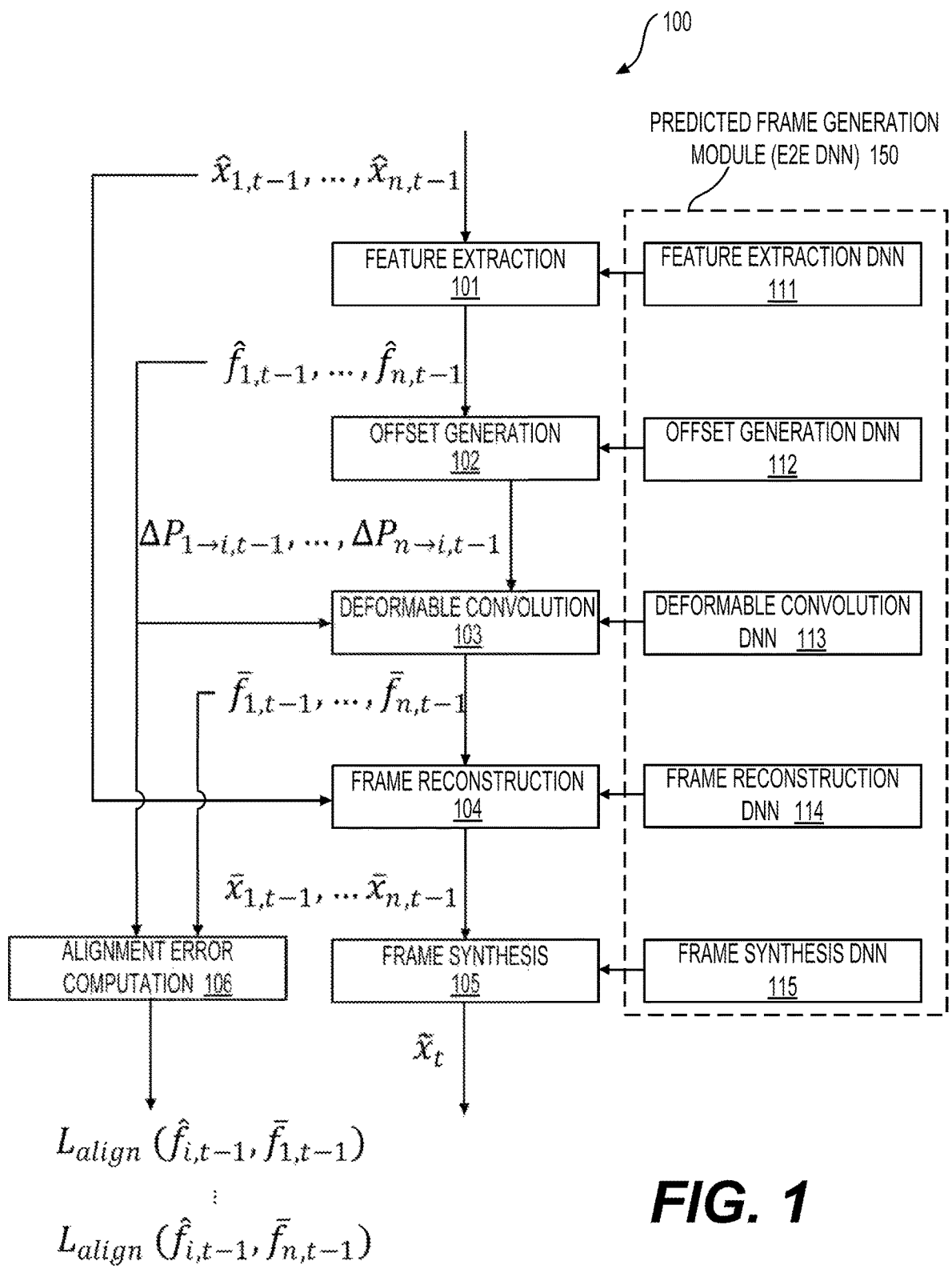
FIG. 1 shows a predicted frame generating process (100) using 2D temporal deformable convolution according to an embodiment of the disclosure.

The present disclosure provides an artificial neural network based video coding method. For example, a predicted frame can be generated using deformable convolutions in a deep neural network (DNN). In addition, the deformable convolutions can be performed over a sequence of reference frames spanning over a period of time. Temporally changed features in separate frames can be captured and aligned to a target frame (served as an alignment basis) and subsequently synthesized into the predicted frame. Thus, the techniques for generating a predicted frame as disclosed herein can be named as temporal deformable convolution based predicted frame generation.

Various embodiments are provided, including two-dimensional (2D) deformable convolution or three-dimensional 3D deformable convolution based embodiments. By jointly considering the quality of the generated predicted frame and the compressibility of the residuals (the difference between the predicted frame and a ground truth frame), the temporal deformable convolution can effectively accommodate complex, long-range motions (in time domain and temporal domain) that often present in videos and improve the compression performance. The terms "frame" and "picture" can be used interchangeably in this disclosure.

II. Handcrafted and Learning based Video Coding

Traditional video coding standards, such as the H.264/Advanced Video Coding (H.264/AVC), High-Efficiency Video Coding (HEVC), and Versatile Video Coding (VVC) share a similar block-based hybrid prediction/transform framework. For example, individual coding tools, such as intra/inter prediction, integer transforms, and context-adaptive entropy coding, are intensively handcrafted to optimize overall efficiency. The spatiotemporal pixel neighborhoods are leveraged for predictive signal construction to obtain corresponding residuals for subsequent transform, quantization, and entropy coding. On the other hand, the nature of DNNs is to extract different levels (e.g., corresponding to different layers in a DNN) of spatiotemporal stimuli by analyzing spatiotemporal information from the receptive field of neighboring pixels. The capability of exploring highly nonlinear and nonlocal spatiotemporal correlations provides promising opportunity for largely improved compression quality.

In an example, an inter prediction process of a video compression framework can be performed as follows. An input video x comprises a plurality of image frames (or pictures) $x_1, \ldots, x_T$. In a first motion estimation step, a frame in the video can be partitioned into spatial blocks. Each block can further be partitioned into smaller blocks recursively, for example, based on a tree structure (e.g., quadtree or binary tree). A set of motion vectors $m_t$ between a current frame x, and a set of previously reconstructed frames $\{\hat{x}_j\}_{t-1}$ can be computed for each block. Note that the subscript t denotes the current t-th encoding cycle, which may not match the timestamp of the image frame. Also, $\{\hat{x}_j\}_{t-1}$ contains frames from multiple previous encoding cycles.

In a second motion compensation step, a predicted frame $\tilde{x}_t$ is obtained by copying the corresponding pixels of the previous $\{\hat{x}_j\}_{t-1}$ based on the motion vectors $m_t$. A residual $r_t$ between the original frame $x_t$ and the predicted frame $\tilde{x}_t$ can be obtained: $r_t = x_t - \tilde{x}_t$. In the third step, the residual $r_t$ is quantized (typically after a transformation (e.g., DCT) where the DCT coefficients of $r_t$ are quantized to get a better quantization performance). The quantization step gives a quantized $\hat{y}_t$. Both the motion vectors $m_t$ and the quantized $\hat{y}_t$ are encoded into a bitstream by entropy coding. The bitstream can be sent to a decoder.

On the decoder side, the quantized $\hat{y}_t$ is first dequantized (typically through an inverse transformation (e.g., inverse DCT) to the dequantized coefficients) to obtain a recovered residual $\hat{r}_t$. Then $\hat{r}_t$ is added back to $\tilde{x}_t$ to obtain reconstructed $\hat{x}_t = \tilde{x}_t + \hat{r}_t$.

Motion estimation is one key component in the above video compression process. Traditional block-based motion vectors $m_t$ cannot work well for non-translational motions, resulting in an ineffective predicted frame $\tilde{x}_t$ and a residual $r_t$ that largely hurt the compression efficiency. To address this issue, various learning based technologies can be employed. For example, learning based optical flow methods can be used to provide accurate motion information at pixel level. However, optical flow is prone to error, especially along the boundary of moving objects. Examples of the optical flow methods are described in the work of R. Yang, F. Mentzer, L. Van Gool, and R. Timofte, "Learning for video compression with hierarchical quality and recurrent enhancement," in CVPR, 2020, which is incorporated by reference herein.

Without explicit motion estimation, frame interpolation methods can be employed to directly compute an additional synthetic frame $\tilde{x}_t$ based on previously reconstructed $\{\hat{x}_j\}_{t-1}$ to help generate more efficient residuals. However, the frames were interpolated based on spatially co-located patches, which cannot handle medium to large motion, which limits the effectiveness of such methods. Examples of the frame interpolation methods are described in the work of H. Choi, I. Bajic, "Deep Frame Prediction for Video Coding," in IEEE Trans. CSVT, 2019, which is incorporated by reference herein.

III. Predicted Frame Generation by Temporal Deformable Convolution

In various embodiments, a potentially high-quality synthetic predicted frame x$\tilde{x}_t$ can be generated based on previously reconstructed reference frames $\{\hat{x}_j\}_{t-1}$. A highly compressible residual frame $r_t$ can thus be generated based on the predicted frame $\tilde{x}_t$. An end-to-end trained or learnable DNN (E2E DNN) can be used to compute the predicted frame $\tilde{x}_t$. In different embodiments, 2D or 3D temporal deformable convolutions can be employed to handle complex and long-range motions to generate the high-quality predicted frame $\tilde{x}_t$. The temporal deformable convolution based coding methods can flexibly support different targets including compression efficiency and visual quality without explicit error-prone motion estimation or image warping.

1. Predicted Frame Generation with 2D Deformable Convolution

FIG. 1 shows a predicted frame generating process (100) using 2D temporal deformable convolution according to an embodiment of the disclosure. The process (100) can take place at a predicted frame generation module (150) in a video coding system (e.g., an encoder or a decoder). The predicted frame generation module (150) can be based on an E2E DNN. In the particular example shown in FIG. 1, the E2E DNN can include a feature extraction DNN (111), an offset generation DNN (112), a deformable convolution DNN (113), a frame reconstruction DNN (114), and a frame synthesis DNN (115).

By performing the process (100), the predicted frame generation module (150) can generate a potentially high-quality predicted frame $\tilde{x}_t$ with a set of n previously reconstructed frames $\{\hat{x}_j\}_{t-1} = \hat{x}_{1,t-1}, \ldots, \hat{x}_{n,t-1}$ as input. For example, the previously reconstructed frames can be stored in a reference picture buffer in the video coding system. The predicted frame $\tilde{x}_t$ can be used to encode a current frame at an encoder or to reconstruct a current frame at a decoder. The current frame, denoted $x_t$, refers to a frame currently under processing (encoding or reconstruction).

The process (100) can include operations performed at the following modules: a feature extraction module (101), an offset generation module (102), a deformable convolution module (103), a frame reconstruction module (104), and a frame synthesis module (105). Those modules (101-105) employ the respective DNNs (111-115) to carry out the respective operations in the FIG. 1 example.

As shown in FIG. 1, using each frame $\hat{x}_{j,t-1}$ ($j \in \{1, 2, \ldots, n\}$) of the reference frames $\{\hat{x}_j\}_{t-1}$ as input, the feature extraction module (101) computes a feature map $\hat{f}_{j,t-1}$ by using the feature extraction DNN (111) through forward inference.

The frame $\hat{x}_{i,t-1}$ among the reference frames $\{\hat{x}_j\}_{t-1}$ can be used as a reference (a target frame) that all other frames among $\{\hat{x}_j\}_{t-1}$ will be aligned to. In some embodiments, the target frame $\hat{x}_{i,t-1}$ can be any frame selected from $\{\hat{x}_j\}_{t-1}$ and used as an alignment basis. In some embodiments, the selection of the target frame $\hat{x}_{i,t-1}$ can depend on the timing of the current frame $x_t$.

In one example, in order to determine the target frame the reference frames in $\{\hat{x}_j\}_{t-1}$ are ranked based on their timestamp in accenting order (e.g., display order). When the current processing is to encode a P frame $x_t$, all these previously reconstructed frames are before $x_t$. The target frame $\hat{x}_{i,t-1}$ can be set to be $\hat{x}_{n,t-1}$.

When the current processing is to encode a B frame, some of the reference frames $\{\hat{x}_j\}_{t-1}$ can be prior to the B frame, and some of the reference frames $\{\hat{x}_j\}_{t-1}$ can be after the B frame. Accordingly, a frame in the reference frames $\{\hat{x}_j\}_{t-1}$ that is adjacent (either in advance of or after) the current frame $x_t$ can be selected to be the target frame. For example, the previously reconstructed frames $\hat{x}_{1,t-1}, \ldots, \hat{x}_{i,t-1}$ are before $x_t$, while the remaining $\hat{x}_{i+1,t-1}, \ldots, \hat{x}_{n,t-1}$ are after $x_t$. Thus, the frame $\hat{x}_{i,t-1}$ is used as the target frame.

When the current target is to encode a low-delay B frame, the target frame $\hat{x}_{i,t-1}$ can be set to be the last frame $\hat{x}_{n,t-1}$. All these previously reconstructed frames are before $x_t$.

The offset generation module (102) computes an offset map $\Delta P_{j \to i, t-1}$ for each feature map $\hat{f}_{j,t-1}$ based on the reconstructed frames $\hat{x}_{j,t-1}$ and $\hat{x}_{i,x-1}$ or based on the extracted features $\hat{f}_{j,t-1}$ and $\hat{f}_{i,t-1}$. In an example, the feature maps $\hat{f}_{i,t-1}$ and $\hat{f}_{j,t-1}$ are used as input and passed through the offset generation DNN (112) to generate the offset map $\Delta P_{j \to i, t-1}$. In an example, the feature maps $\hat{f}_{i,t-1}$ and $\hat{f}_{j,t-1}$ can be concatenated first to form a concatenated feature map before being input to the offset generation DNN (112).

The deformable convolution module (103) uses the deformable convolution DNN (113) to compute an aligned feature map $\bar{f}_{j,t-1}$ based on the respective feature map $\hat{f}_{j,t-1}$ and the respective offset map $\Delta P_{j \to i, t-1}$. One or more aligned feature maps $\bar{f}_{j,t-1}$ can be generated corresponding to each extracted feature map $\hat{f}_{j,t-1}$.

As an example, let $w_k$, $k=1, \ldots, K$, denote the weight coefficients of a 2D deformable convolution kernel, and let $p_k$ denote a pre-specified offset for the k-th location in the kernel, e.g., a 3×3 kernel is defined with K=9 and $p_k \in \{(-1, -1), (-1, 0), \ldots, (1, 1)\}$. A 2D deformable convolution layer computes an output feature $f_{out}$ based on an input feature $f_{in}$ and a learnable offset map $\Delta P$, where the feature at a sampling location $p_0$ is given by:

$$f_{out}(p_0) = \Sigma_{k=1}^{K} w_k f_{in}(p_0 + P_k + \Delta p_k) \quad \text{(Eq. 1)}$$

Since the irregular position $p_0 p_k + \Delta p_k$ may not be an integer, this deformable convolution operation can be conducted by using interpolations (e.g., bilinear interpolation).

The deformable convolution DNN (113) can be formed by stacking several such deformable convolution layers (each followed by a non-linear activation layer such as ReLU) as well as other DNN layers (such as bottleneck layers). In an example, the deformable convolution layers can use the same or different 2D deformable convolution kernels. In an example, the deformable convolution layers can use the same or different offset maps.

Deformable convolution has an enhanced capability of handling geometric transformation (e.g., different scales or deformation at different locations) in spatial domain. For a sequence of frames, caused by various types of motions, different scales or deformation can take place at different time occasions. By the deformable convolution at the deformable convolution DNN (113), the features at different occasions (that are deformed/scaled differently) can be captured in the resulting feature maps. In addition, those feature maps are aligned to a target time instant corresponding to the target frame (and the current frame). Then, based on the aligned feature maps, a predicted frame can be constructed. It can be seen that the temporal deformable convolution can handle the motions in the sequence of frames to generate a predicted frame corresponding to the time instant of the target frame (and the current frame).

An alignment loss $L_{align}(\hat{f}_{i,t-1}, \bar{f}_{j,x-1})$ can be computed to measure the error of misalignment between the aligned feature map $\bar{f}_{j,x-i}$ and the extracted feature map $\hat{f}_{L,t-1}$ at an alignment error computation module (106). For example, the $L_1$-norm (mean of absolution error) or $L_2$ norm (mean of square error) can be used for $L_{align}(\hat{f}_{i,t-1}, \bar{f}_{j,t-1})$. Those alignment losses can be calculated similarly during a training process and used as part of a loss function.

In an example, using the aligned feature maps $\bar{f}_{j,t-1}$ and, optionally, the extracted feature maps $\hat{f}_{i,t-1}$, the frame reconstruction module (104) uses the frame reconstruction DNN (114) through feed-forward inference computation to generate an aligned frame $\bar{x}_{j,t-1}$ corresponding to each aligned feature map $\bar{f}_{j,t-1}$. Then, the aligned frames $\bar{x}_{1,t-1}, \ldots \bar{x}_{n,t-1}$ can be passed through the frame synthesis module (105) to generate the synthesized predicted frame $\tilde{x}_t$ by using the frame synthesis DNN (115).

In various embodiments, there may be different ways for generating the predicted frame $\tilde{x}_t$ from the aligned feature maps $\bar{f}_{j,t-1}$. In an example, the number of the aligned frames $\bar{x}_{1,t-1}, \ldots \bar{x}_{n,t-1}$ may be less than n. In an example, one DNN may operate in place of both the frame reconstruction DNN (114) and the frame synthesis DNN (115) to generate the predicted frame $\tilde{x}_t$ from the aligned feature maps $\bar{f}_{j,t-1}$. In an example, the aligned feature maps $\bar{f}_{j,t-1}$ can first be synthesized to one or more (fewer than n) feature maps that are subsequently used to generate the predicted frame $\tilde{x}_t$.

In some embodiments, the offset generation module (102) and the offset generation DNN (112) may be removed from the process 100 or the predicted frame generation module (150). Accordingly, no offset map is explicitly generated. The offsets $\Delta p_k$ at each pixel position used in each 2D deformable convolution layer of the deformable convolution DNN (113) can be treated as a trainable model parameter, which together with the 2D deformable convolution kernel(s) can be learned during a training process.

It is noted that, in this disclosure, there are no restrictions on the specific network structures (types of layers, number of layers, kernel sizes, etc.) on the feature extraction DNN (111), offset generation DNN (112), deformable convolution DNN (113), frame reconstruction DNN (114), or frame synthesis DNN (115). For example, any backbone network (e.g., ResNet) can be used as a feature extraction DNN; a set of regular convolution and bottleneck layers can be stacked as an Offset Generation DNN; a set of deformable convolution layers can be stacked as a deformable convolution DNN; a few convolution layers with skip connections can be stacked together as a frame reconstruction DNN; and a few residual block layers can be stacked together as a frame synthesis DNN.

2. Predicted Frame Generation with 3D Deformable Convolution

Figure 2:
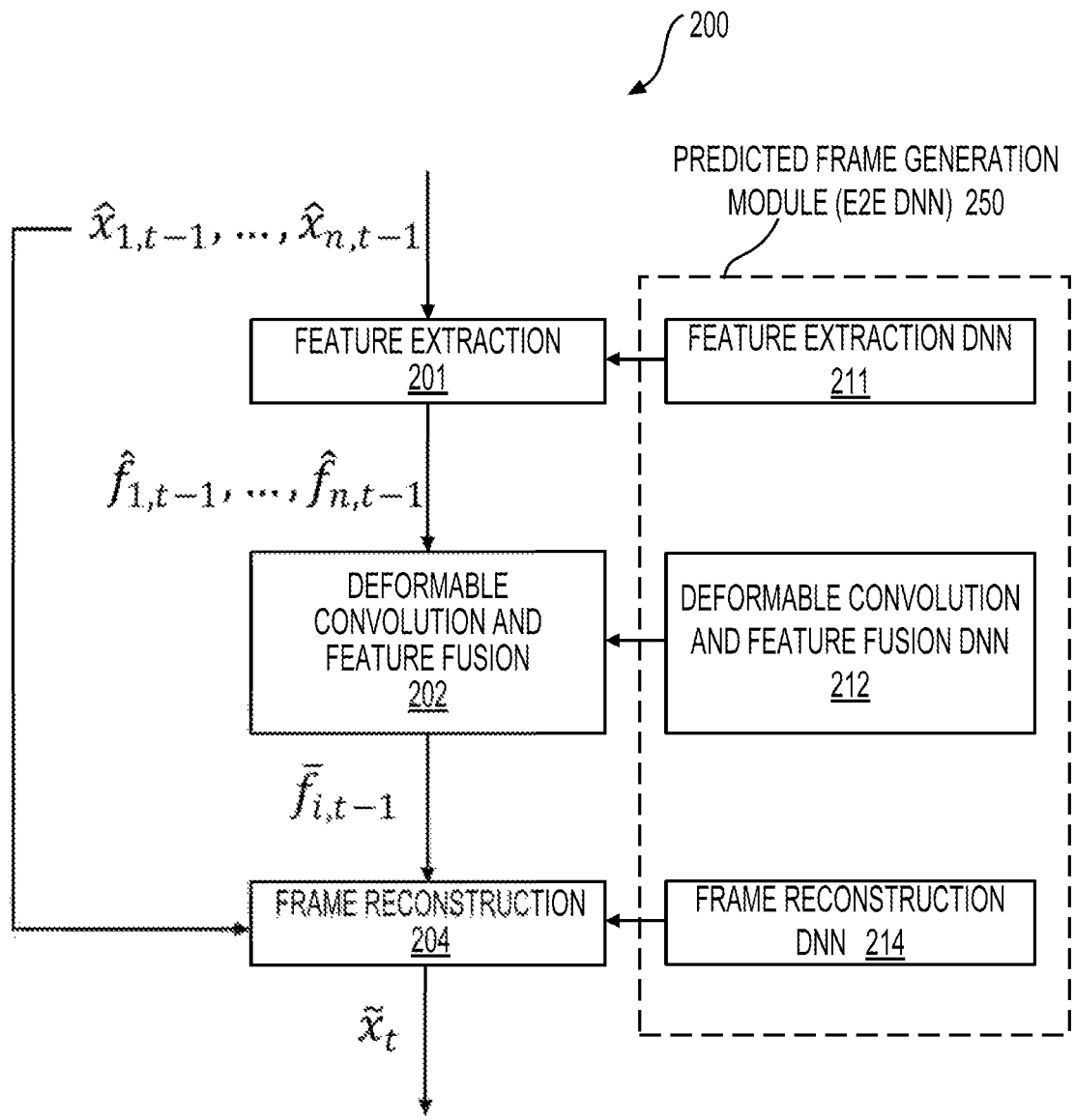
FIG. 2 shows another predicted frame generating process (200) using 3D temporal deformable convolution according to an embodiment of the disclosure.

FIG. 2 shows another predicted frame generating process (200) using 3D temporal deformable convolution according to an embodiment of the disclosure. The process (200) can take place at a predicted frame generation module (250) in a video coding system (e.g., an encoder or a decoder). The predicted frame generation module (250) can be based on an E2E DNN. In the particular example shown in FIG. 2, the E2E DNN can include a feature extraction DNN (211), a deformable convolution and feature fusion DNN (212), and a frame reconstruction DNN (213).

By performing the process (200), the predicted frame generation module (250) can generate a predicted frame $\tilde{x}_t$ (potentially high quality) for coding a video with a set of n previously reconstructed frames $\{\hat{x}_j\}_{t-1} = \hat{x}_{1,t-1}, \ldots, \hat{x}_{n,t-1}$ as input. The predicted frame $\tilde{x}_t$ can be used to encode a current frame at an encoder or to reconstruct a current frame at a decoder.

The process (200) can include operations performed at the following modules: a feature extraction module (201), a deformable convolution and feature fusion module (202), and a frame reconstruction module (203). Those modules (201-203) employ the respective DNNs (211-213) to carry out the respective operations.

In an example, the input frames $\hat{x}_{1,t-1}, \ldots, \hat{x}_{n,t-1}$ can be stacked together to form a 4-dimensional (4D) input tensor of size (n, c, h, w), where c is the number of channels (e.g., 3 for color frames), and (h, w) gives the resolution of the video frames (e.g., height and width). As illustrated in FIG. 2, the feature extraction module (201) can compute a 4D feature tensor $\hat{f}_{1,t-1}, \ldots, \hat{f}_{n,t-1}$ by using the feature extraction DNN (211) through forward inference. Various DNNs with various structures can be employed to implement the feature extraction module (201).

In an embodiment, to compute the feature maps $\hat{f}_{1,t-1}, \ldots, \hat{f}_{n,t-1}$ to capture the spatiotemporal characteristics in the video, the feature extraction DNN (211) uses 3D convolution layers (C3D) described in the work of D. Iran, and et al., "Learning spatiotemporal features with 3d convolutional networks," in ICCV, 2015, which is incorporated by reference in its entirety.

In another embodiment, each individual feature map $\hat{f}_{1,t-1}, \ldots, \hat{f}_{n,t-1}$ can be computed using 2D convolution layers similar to the method described in the FIG. 1 example based on each input frame individually, and concatenated into a 4D tensor afterwards. In any case of the embodiments, the output of the feature extraction module (201) can be a 4D feature tensor.

For performing the 3D temporal deformable convolution, let $w_k$, $k=1, \ldots, K$, denote the weight coefficients of a 3D deformable convolution kernel, and let $p_k$ denote a pre-specified offset for the k-th location in the kernel, e.g., a 3×3×3 kernel is defined with K=27 and $p_k \in \{(-1, -1, -1), (-1, -1, 0), \ldots, (1, 1, 1)\}$. A 3D deformable convolution layer computes an output feature $f_{out}$ based on an input feature $f_{in}$ and a learnable offset $\Delta P$, where the feature at a sampling location $p_0$ is given by:

$$f_{out}(p_0) = \Sigma_{k=1}^{K} w_k f_{in}(p_0 + P_k + \Delta p_k) \quad \text{(Eq. 2)}$$

Since the irregular position $p_0 + p_k + \Delta p_k$ may not be an integer, this deformable convolution operation can be conducted by using interpolations (e.g., bilinear interpolation) in 3D space.

As shown in FIG. 2, the deformable convolution and feature fusion DNN (212) can be formed by stacking several above-described 3D deformable convolution layers (each followed by a non-linear activation layer such as ReLU) as well as other DNN layers (such as bottleneck layers). The frame $\hat{x}_{i,t-1}$ can be a reference that all other frames will be aligned to. The deformable convolution and feature fusion module (202) uses the deformable convolution and feature fusion DNN (212) to compute a fused aligned feature map $\bar{f}_{i,t-1}$ based on the 4D feature tensor $\hat{f}_{1,t-1}, \ldots, \hat{f}_{n,t-1}$.

Then the frame reconstruction module (203) uses the frame reconstruction DNN (213) to compute the reconstructed predicted frame $\tilde{x}_t$ based on the fused aligned feature map $\bar{f}_{i,t-1}$. As described, in contrast to the FIG. 1 example where the aligned feature maps are generated, no explicit spatial alignment is conducted in this pipeline of FIG. 2. Instead, the 3D deformable convolution directly learns spatiotemporal offsets to generate an aligned fused feature map $\bar{f}_{i,t-1}$.

Similar to the FIG. 1 example, there are no restrictions on the specific network structures (types of layers, number of layers, kernel sizes, etc.) on the feature extraction DNN (211), deformable convolution and feature fusion DNN (212), or frame reconstruction DNN (213).

Figure 3:
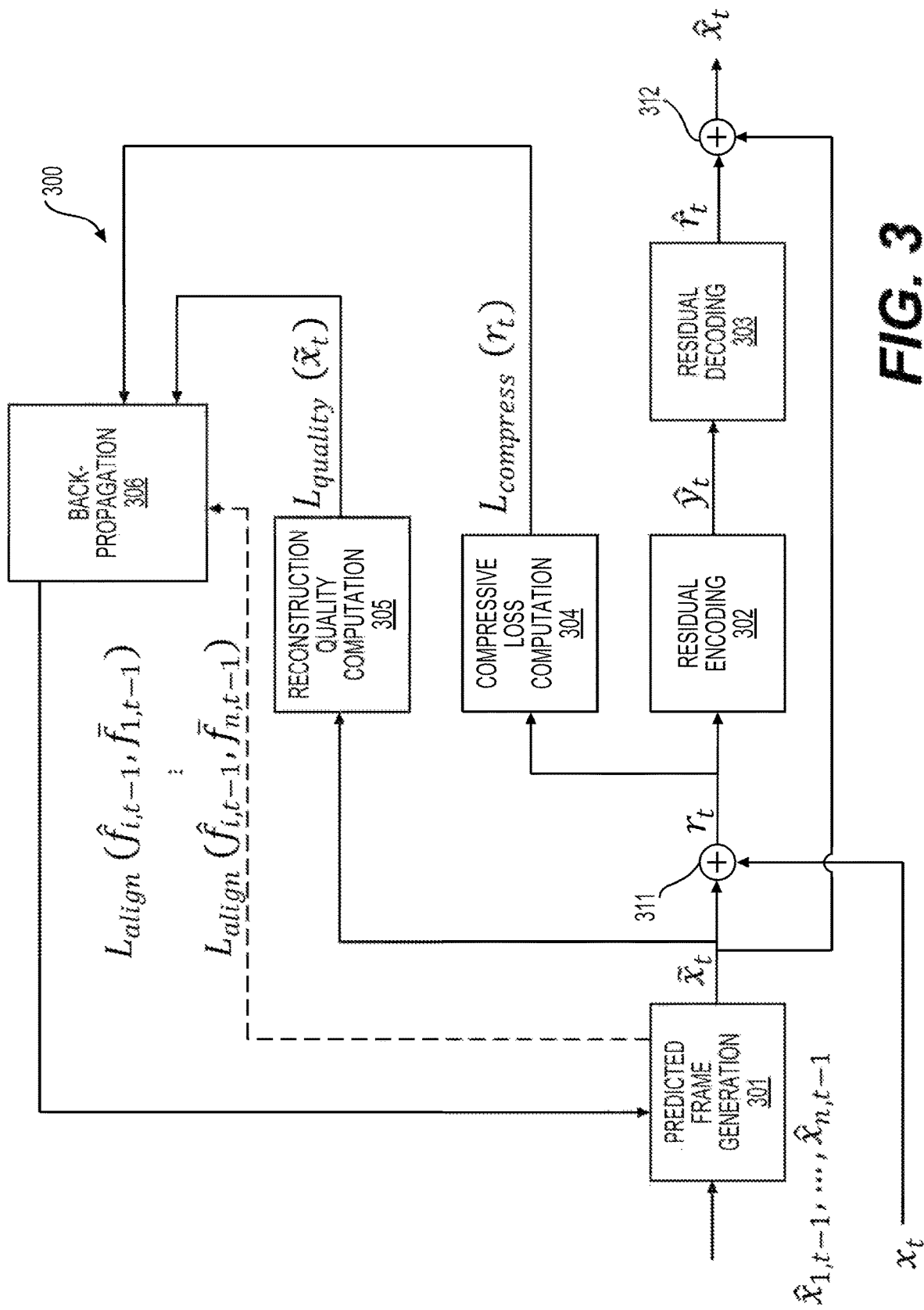
FIG. 3 shows a neural network training process (300) according to embodiments of the disclosure.

IV. Training Process for Predicted Frame Generation by Temporal Deformable Convolution FIG. 3 shows a neural network training process (300) according to embodiments of the disclosure. During the training process (300), model parameters of neural networks in a predicted frame generation module (301) can be optimized and determined. For example, the predicted frame generation modules (150) or (250) in the FIG. 1 or FIG. 2 examples can be put in place of the predicted frame generation module (301) and trained using the training process (300).

In an embodiment, during a current iteration of the training process (300), similar to the FIG. 1 and FIG. 2 examples, the predicted frame generation module (301) receives a set of reference frames $\hat{x}_{1,t-1}, \ldots, \hat{x}_{n,t-1}$ and generates a predicted frame $\tilde{x}_t$ for a current frame $x_t$. The neural networks in the predicted frame generation module (301) can be configured with model parameters updated at the end of the last iteration. In some embodiments, for training purpose, down-sampled original frames in a video sequence can be used at the place of the set of reference frames $\hat{x}_{1,t-1}, \ldots, \hat{x}_{n,t-1}$, which is described later.

After obtaining the predicted frame $\tilde{x}_t$ from the predicted frame generation module (301), a residual $r_t$ between the original frame (the current frame) $x_t$ and the predicted frame $\tilde{x}_t$ can be obtained as follows using an addition module (311):

$$r_t = x_t - \tilde{x}_t \tag{Eq. 3}$$

Then a compressive loss $L_{compress}(r_t)$ can be computed by a compressive loss computation module (304) to measure the potential compression rate of the residual $r_t$. For example, the $L_1$-norm (mean absolute error) of the residual $r_t$ can be used to promote the overall sparsity of the residual for better compression. More sophisticated statistic rate estimation methods can also be used here.

For example, an entropy for each element in the residual $r_t$ can be estimated. Based on the estimated entropies, a number of bits for coding the residual $r_t$ can accordingly be determined. A bitrate (e.g., bit per pixel (BPP) or bit per second (BPS)) can thus be determined and used as a compressive loss $L_{compress}(r_t)$ for coding the current frame $x_t$. Various techniques for estimating the entropies and the rate loss can be employed in various embodiments. An example of the rate loss estimation method is described by J. Balle et al., "End-to-end Optimized Image Compression" in the International Conference on Learning Representations (ICLR) 2017.

A reconstruction quality loss $L_{quality}(\tilde{x}_t)$ can be computed by a reconstruction quality loss computation module (305) to measure the quality of the reconstructed aligned predicted frame $\tilde{x}_t$. In an example, the quality of the reconstructed aligned predicted frame $\tilde{x}_t$ can be determined with respect to the current frame $x_t$.

In an embodiment, during the training process (300), the original video sequence is down-sampled temporally so that ground-truth frames for the synthesized aligned predicted frames are available. For example, the original T frames $x_1, x_2, \ldots, x_T$ can be down-sampled temporally to T/2 frames $x_2, x_4, \ldots, x_T$. Using the down-sampled sequence, the predicted frame generation module (301) can compute the predicted frame $\tilde{x}_t$ corresponding to a given reference frame $\hat{x}_{i,t-1}$. A ground-truth frame $x_i^G$ corresponding to the reference frame $\hat{x}_{i,t-1}$ is available. In an example, a frame not belonging to the down-sampled frames $x_2, x_4, \ldots, x_T$ can be used as the ground-truth frame $x_i^G$. The ground-truth frame $x_i^G$ can be used as the current frame $x_i$. The frame among the down-sampled frames $x_2, x_4, \ldots, x_T$ that neighbors the ground-truth frame $x_t^G$ can be used as the reference frame $\hat{x}_{i,t-1}$. Then the $L_2$-norm (MSE) between $x_i^G$ and $\tilde{x}_t$ can be used as $L_{quality}(\tilde{x}_t)$.

The compressive loss $L_{compress}(r_t)$ and the quality loss $L_{quality}(\tilde{x}_t)$ can be combined as:

$$L_{joint} = L_{compress}(r_t) + \lambda L_{quality}(\tilde{x}_t) \tag{Eq. 4}$$

In addition, as illustrated in FIG. 1, for the case where the 2D deformable convolution is used by the predicted frame generation module (301), the set of alignment loss $L_{align}(\hat{f}_{i,t-1}, \bar{f}_{1,t-1}), \ldots, L_{align}(\hat{f}_{i,t-1}, \bar{f}_{n,t-1})$ can also be added (as an option as marked by the dashed line in FIG. 1) into the above joint loss as follows:

$$L_{joint} = L_{compress}(r_t) + \lambda L_{quality}(\tilde{x}_t) + \lambda_1 L_{align}(\hat{f}_{i,t-1}, \bar{f}_{1,t-1}) + \ldots + \lambda_n L_{align}(\hat{f}_{i,t-1}, \bar{f}_{n,t-1}) \tag{Eq. 5}$$

Then the gradient of the joint loss $L_{joint}$ (Eq. 4 or Eq. 5) can be computed and back-propagated through a back-propagation module (306) to update the DNN model parameters (e.g., weight coefficients, offsets, etc.) in the predicted frame generation module (301). For example, the model parameters can be the model parameters in the DNNs (111-115) in the FIG. 1 example or the DNNs (211-213) in the FIG. 2 example.

In an embodiment, the residual $r_t$ is encoded by a residual encoding module (302) to generate a compressed representation $\hat{y}_t$. Based on $\hat{y}_t$, a residual decoding module (3030) computes a decoded residual $\hat{r}_t$, which is added back to the predicted frame $\tilde{x}_t$ at an addition module (312) to compute a new reconstructed frame $\hat{x}_t$. Then, in an example, the predicted frame $\tilde{x}_t$ and/or the reconstructed frame $\hat{x}_t$ are added to update the previously constructed frame set $\{\hat{x}_j\}_{t-1}$. For example, the oldest frames far from the current frame can be removed from the set. Then the system enters the next encoding cycle (training cycle or iteration) from t to t+1.

Figure 4:
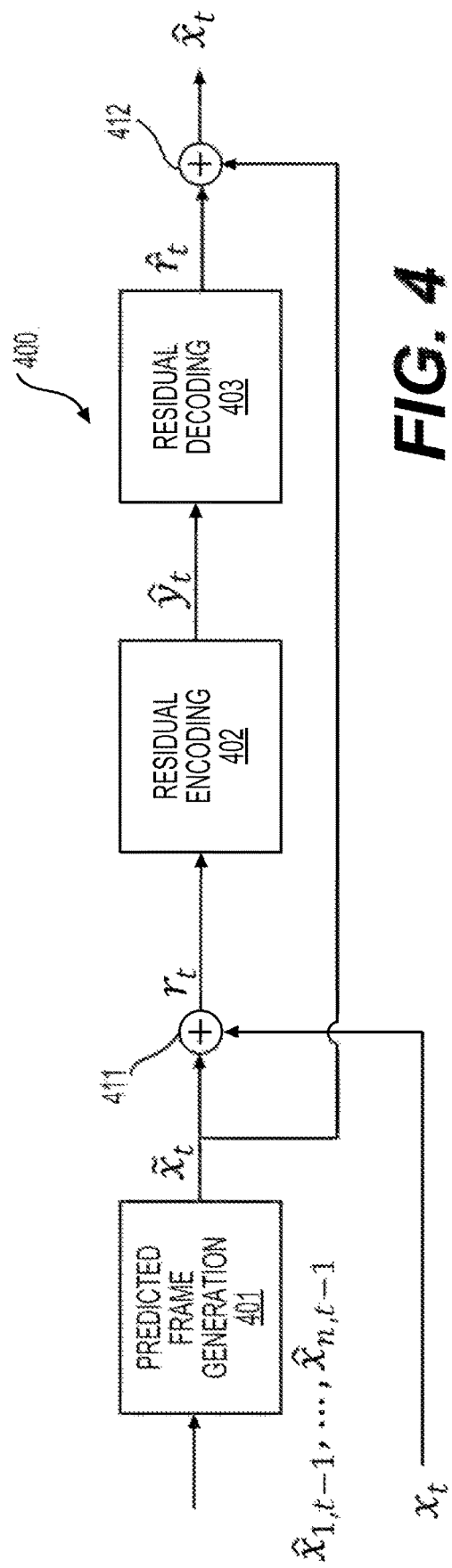
FIG. 4 shows a video encoder (400) according to an embodiment of the disclosure.

V. Coding Systems with Predicted Frame Generation by Temporal Deformable Convolution FIG. 4 shows a video encoder (400) according to an embodiment of the disclosure. The video encoder (400) can include a predicted frame generation module (401) that is configured to perform temporal deformable convolution to generate a predicted frame $\tilde{x}_t$ for encoding a current frame $x_t$. In addition, the video encoder (400) can further include a residual encoding module (402), a residual decoding module (403), a first addition module (411), and a second addition module (412). Those elements are coupled together as shown in FIG. 4.

Given a set of n previously reconstructed frames $\{\hat{x}_j\}_{t-1} = \hat{x}_{1,t-1}, \ldots, \hat{x}_{n,t-1}$ (e.g., stored in a reference frame buffer) as inputs, the predicted frame generation module (401) can generate the predicted frame $\tilde{x}_t$ by using the framework illustrated in FIG. 1 (based on 2D deformable convolution) or the one illustrated in FIG. 2 (based on 3D deformable convolution). Then, a residual $r_t$ between the original frame $x_t$ and the predicted frame $\tilde{x}_t$ can be computed using the first addition module (411). The residual $r_t$ can be encoded by the residual encoding module (402) to generate a compressed representation $\hat{y}_t$.

Based on the compressed representation $\hat{y}_t$, the residual decoding module (403) computes the decoded residual $\hat{r}_t$. The decoded residual $\hat{r}_t$ is added back to the predicted frame $\tilde{x}_t$ at the second addition module (412) to compute the new reconstructed frame $\hat{x}_t$.

The compressed representation $\hat{y}_t$ (after entropy coding) can be sent to a decoder side, for example, transmitted in a bitstream. Then the reconstructed $\hat{x}_t$ and/or the generated predicted frame $\tilde{x}_t$ can be added to update the set of frames $\{\hat{x}_j\}_{t-1}$. The encoding system (400) enters the next encoding cycle from t to t+1.

Figure 5:
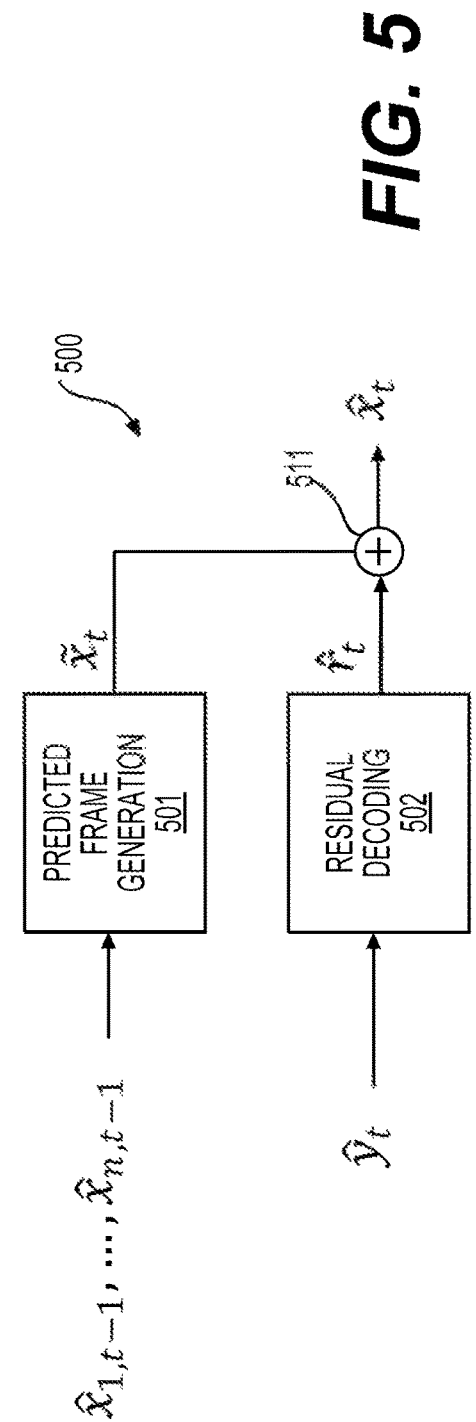
FIG. 5 shows a video decoder (500) according to an embodiment of the disclosure.

FIG. 5 shows a video decoder (500) according to an embodiment of the disclosure. The video decoder (500) can include a predicted frame generation module (501) that is configured to perform temporal deformable convolution to generate a predicted frame $\tilde{x}_t$ for reconstructing a current frame $x_t$. In addition, the video encoder (500) can further include a residual decoding module (502), and an addition module (511). Those elements are coupled together as shown in FIG. 5.

As shown, after receiving a compressed representation $\hat{y}_t$, for example, from a bitstream generated from the video encoder (400), the residual decoding module (502) computes the decoded residual $\hat{r}_t$. Given a set of previously reconstructed frames $\{\hat{x}_j\}_{t-1} = \hat{x}_{1,t-1}, \ldots, \hat{x}_{n,t-1}$, the predicted frame generation module (501) computes a predicted frame $\tilde{x}_t$. Then the predicted frame $\tilde{x}_t$ and the residual $\hat{r}_t$ are added together at the addition module (511) to obtain a reconstructed frame $\hat{x}_t$ corresponding to the current frame $x_t$.

The reconstructed $\hat{x}_t$ and/or the generated predicted frame $\tilde{x}_t$ can be added to update the set of reference frames $\{\hat{x}_j\}_{t-1}$. The decoding system (500) enters the next decoding cycle from t to t+1.

It is noted that there is no restriction on the type of encoding and decoding methods used by the residual encoding and residual decoding modules in the video encoder (400) or the decoder (500). For example, residual signal processing methods in HEVC or VVC coding standards or other non-standardized methods can be employed in the residual processing modules (402), (403), and (502).

Figure 6:
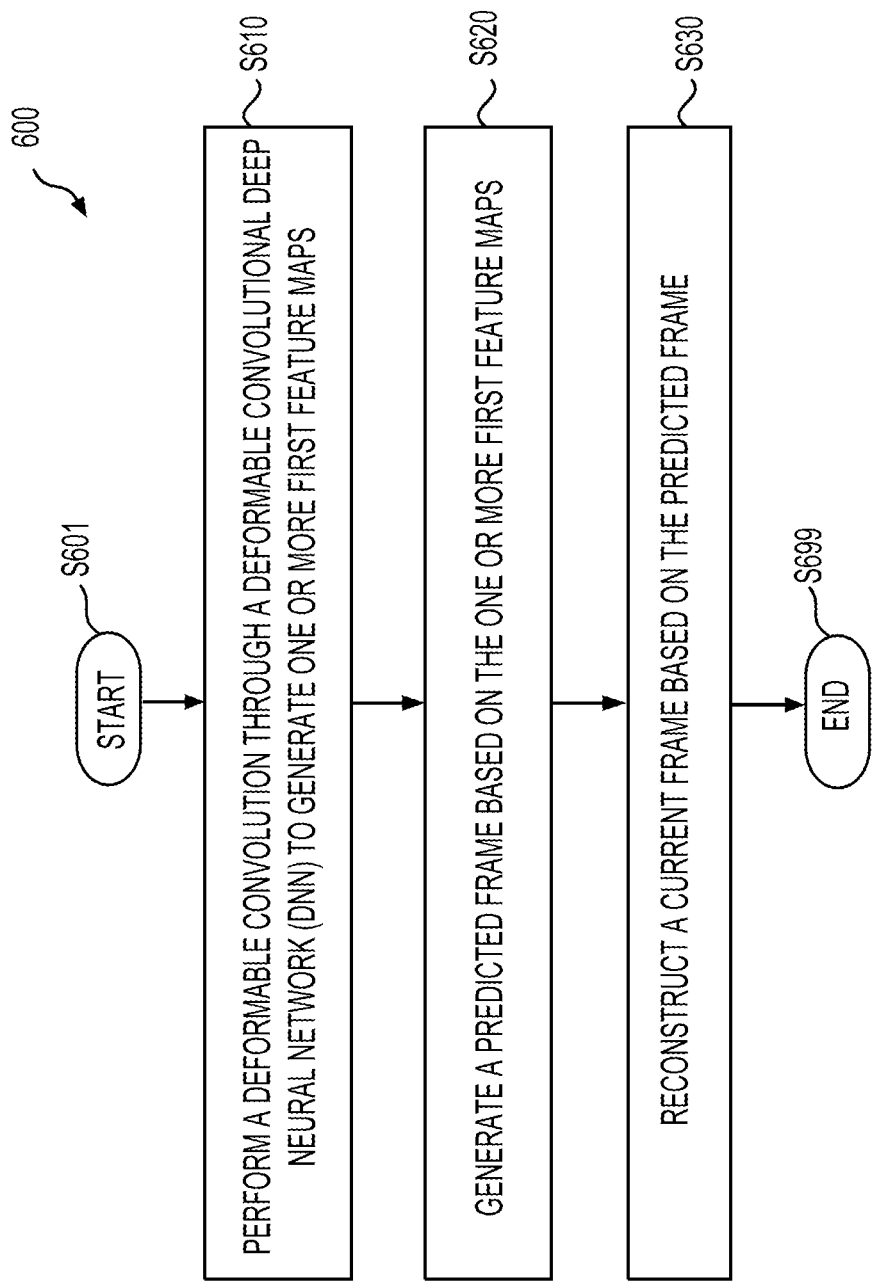
FIG. 6 shows a video coding process (600) according to an embodiment of the disclosure.

VI. Video Coding Processes Based on Predicted Frame Generation by Temporal Deformable Convolution FIG. 6 shows a video coding process (600) according to an embodiment of the disclosure. The process (600) can be performed at a video encoder or a video decoder to generate a predicted frame. The process (600) can start from (S601) and proceed to (S610).

At (S610), a deformable convolution can be performed through a deformable convolutional DNN to generate one or more first feature maps based on a set of one or more previously reconstructed reference frames.

For example, a set of one or more second feature maps corresponding to the one or more previously reconstructed reference frames can be generated based on a feature extraction DNN. One or more offset maps corresponding to the one or more second feature maps, respectively, can be generated using an offset generation DNN. For example, each offset map can be generated based on the following input to the offset generation DNN: the second feature map corresponding to the offset map being generated, and the second feature map corresponding to a target frame that is one of the one or more previously reconstructed reference frames. The one or more offset maps can have the same target frame.

In an example, the target frame can be any one of the one or more reconstructed reference frames. In an example, the target frame neighbors the current frame when the current frame and the one or more previously reconstructed reference frames are arranged in display order. In an example, the target frame can be the last frame of the one or more previously reconstructed reference frames when the current frame is a P frame. The target frame can be the last frame of the frames that are prior to the current frame in display order among the one or more previously reconstructed reference frames when the current frame is a B frame.

In an example, the deformable convolutional DNN can receive the one or more second feature maps as an input, and generate the one or more first feature maps corresponding to the one or more second feature maps, respectively. For example, the deformable convolution DNN can include one or more deformable convolution layers each associated with a deformable convolution kernel. At one of the one or more deformable convolution layers, corresponding to each second feature map, a deformable convolution is performed based on the respective deformable convolution kernel and the offset map of the respective second feature map.

At (S620), the predicted frame can be generated based on the one or more first feature maps. For example, one or more aligned frames can be reconstructed using a frame reconstruction DNN based on the one or more first feature maps and the one or more previously reconstructed reference frames. The predicted frame can be generated using a frame synthesis DNN based on the one or more aligned frames.

At (S630), a current frame can be reconstructed based on the predicted frame. For example, at a decoder side, the predicted frame can be combined with a reconstructed residual frame (or signal) to generate a reconstructed current frame. The reconstructed current frame can then be used as a reference frame for decoding a next current frame.

In some example, the reconstruction of the current frame can be block based. For example, for a current block (partitioned from the current block) under processing, a corresponding predicted block can be partitioned from the predicted frame and combined with a residual signal of the current block to reconstruct the current block.

At an encoder side, a residual signal can be generated between the current frame and the predicted frame. The residual signal can then be encoded to a compressed representation and transmitted in a bitstream. The compressed representation can then be decoded to generate a reconstructed residual signal. The reconstructed signal can then be combined with the predicted frame to generate a reconstructed current frame. The reconstructed current frame can be used as a reference frame for coding a next current frame. The process (600) can proceed to (S699) can terminate at (S699).

Figure 7:
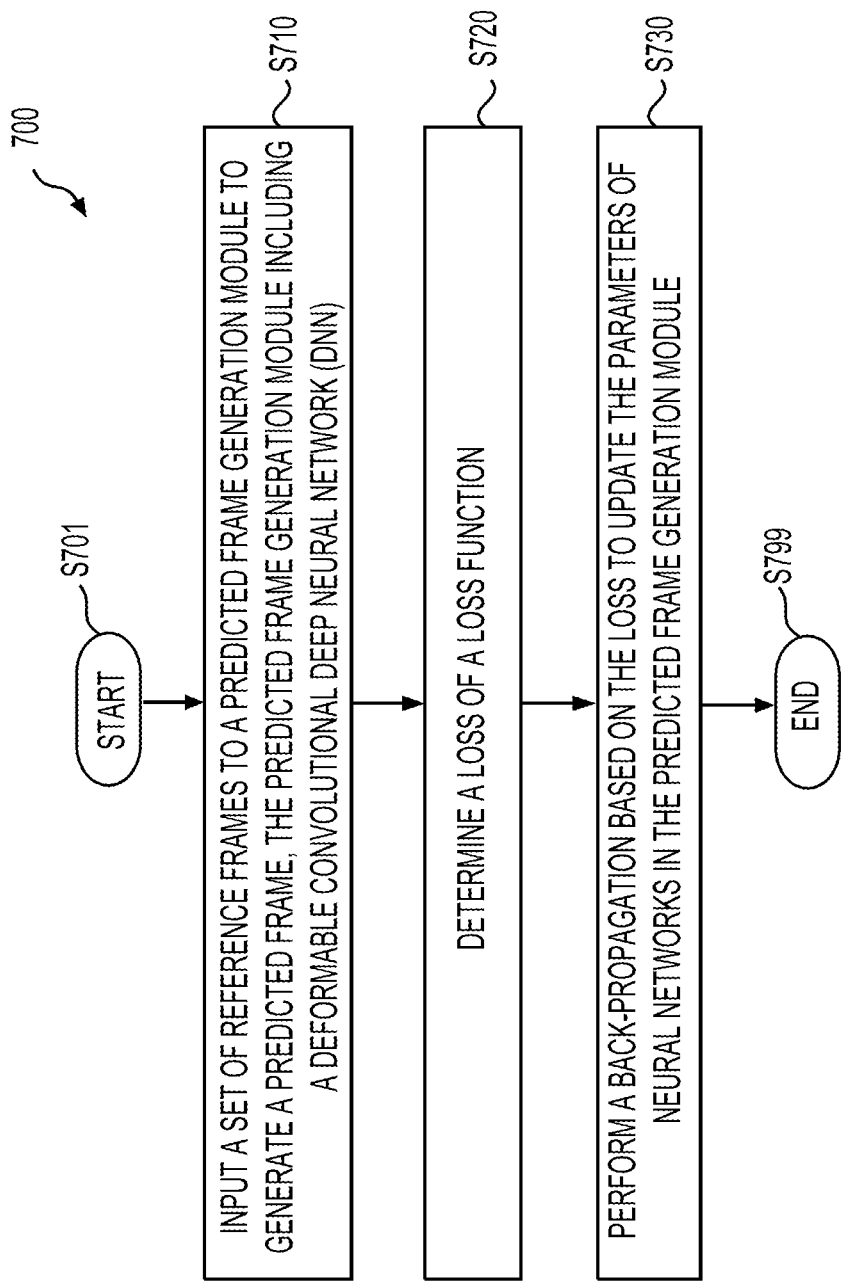
FIG. 7 shows a neural network training process (700) according to an embodiment of the disclosure.

FIG. 7 shows a neural network training process (700) according to an embodiment of the disclosure. The process (700) can start from (S701) and proceed to (S710).

At (S710), a set of reference frames are input to a predicted frame generation module to generate a predicted frame. The predicted frame generation module can include neural networks having parameters that are to be optimized. The neural networks can include a deformable convolutional deep neural network (DNN). In an example, the reference frames are selected from a sequence of frames in a video based on a temporal down-sampling operation. A frame in the sequence of frames that is not selected by the down-sampling operation is used as the ground-truth frame.

At (S720), a loss of a loss function can be determined. The loss function can include a compressive loss indicating a bitrate estimated based on a difference between the predicted frame and a ground-truth frame, and a reconstruction quality loss indicating a quality of the predicted frame with respect to the ground-truth frame.

In an example, the loss function can further include an alignment loss indicating an alignment error. The alignment loss can be determined as follows. First feature maps corresponding to the reference frames can be generated respectively using a feature extraction DNN in the predicted frame generation module. Second feature maps corresponding to the first feature maps can be generated respectively using the deformable convolution DNN in the predicted frame generation module. A difference is determined between one of the second feature maps and the first feature map corresponding to the reference frame that neighbors the ground-truth frame when the ground-truth frame and the reference frames are arranged in display order. Differences can be determined for each of the second feature maps with respect to the first feature map corresponding to the reference frame that neighbors the ground-truth frame. The differences can be included in the alignment loss.

At (S730), a back-propagation can be performed based on the loss and the loss function to update the parameters of the neural networks in the predicted frame generation module. The process (700) can proceed to (S799) and terminate at (S799).

VII. Computer System

The techniques (e.g., functions, modules, elements, methods, processes, operations in various embodiments or examples) disclosed herein can be implemented by processing circuitry (e.g., one or more processors or one or more integrated circuits). In some examples, the techniques can be implemented as computer software using computer-readable instructions and physically stored in one or more computer-readable media.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (CPUs), and the like.

The instructions can be executed on various types of computers or components thereof, including, for example, personal computers, tablet computers, servers, smartphones, gaming devices, internet of things devices, and the like.

Figure 8:
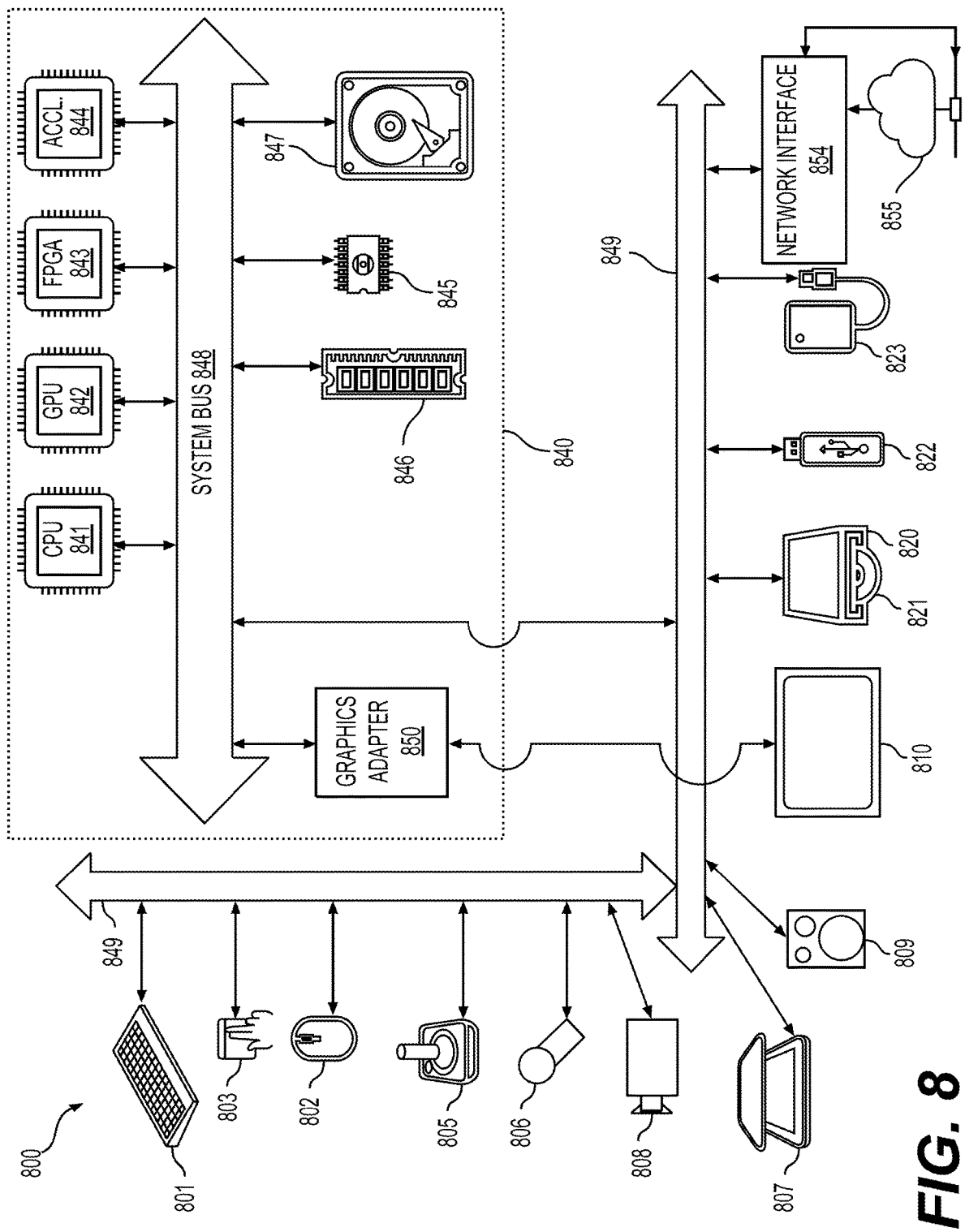
FIG. 8 is a schematic illustration of a computer system (800) according to an embodiment.

FIG. 8 shows a computer system (800) suitable for implementing certain embodiments of the disclosed subject matter. The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), and camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). The one or more networks (855) can for example be wireless, wireline, optical. The one or more networks (855) can further be local, wide-area, metropolitan, vehicular and industrial, real-time, delay-tolerant, and so on. Examples of the one or more networks (855) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850) and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example, accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video coding at a video coding device, comprising:
   generating a first feature map using a feature extraction deep neural network (DNN) based on one or more previously reconstructed reference frames, the first feature map including one of a two-dimensional feature map, a three-dimensional feature map, or a four-dimensional (4D) feature tensor that is generated based on an input of a 4D tensor formed by the one or more previously reconstructed reference frames;
   performing a deformable convolution through a deformable convolutional DNN to generate a second feature map based on the first feature map;
   generating a predicted frame based on the second feature map; and
   reconstructing a current frame based on the predicted frame.

2. The method of claim 1, further comprising:
   generating an offset map corresponding to the first feature map using an offset generation DNN, the offset map being generated based on a difference between each frame of the one or more previously reconstructed reference frames and a target frame that is determined in the one or more previously reconstructed reference frames.

3. The method of claim 2, wherein the target frame neighbors the current frame when the current frame and the one or more previously reconstructed reference frames are arranged in a display order.

4. The method of claim 2, wherein the target frame is a last frame of the one or more previously reconstructed reference frames when the current frame is a P frame, and the target frame is a last frame of a subset of the one or more previously reconstructed reference frames that are prior to the current frame in a display order when the current frame is a B frame.

5. The method of claim 2, wherein the performing the deformable convolution through the deformable convolutional DNN to generate the second feature map comprises:
   receiving the first feature map as an input to the deformable convolutional DNN; and generating the second feature map corresponding to the first feature map.

6. The method of claim 5, wherein the deformable convolutional DNN includes one or more deformable convolution layers, each of the one or more deformable convolution layers being associated with a deformable convolution kernel, and the performing further comprises:
performing the deformable convolution through the deformable convolutional DNN to generate the second feature map based on the first feature map and the offset map, wherein:
each of the one or more deformable convolution layers generates an output feature in the second feature map based on an input feature in the first feature map, a corresponding deformable convolution kernel and a corresponding offset in the offset map associated with the input feature in the first feature map.

7. The method of claim 1, wherein the generating the predicted frame based on the second feature map includes:
reconstructing one or more aligned frames using a frame reconstruction DNN based on the second feature map and the one or more previously reconstructed reference frames; and
generating the predicted frame using a frame synthesis DNN based on the one or more aligned frames.

8. The method of claim 1, wherein the performing the deformable convolution through the deformable convolutional DNN to generate the second feature map includes:
receiving the 4D feature tensor as an input to the deformable convolutional DNN; and
generating the second feature map that is a fused aligned feature map.

9. The method of claim 8, wherein the deformable convolutional DNN includes one or more 3D deformable convolution layers such that each of the one or more 3D deformable convolution layers is associated with a 3D deformable convolution kernel and a 3D offset map, and a 3D deformable convolution is performed based on the respective 3D deformable convolution kernel and the respective 3D offset map at one of the one or more 3D deformable convolution layers.

10. The method of claim 8, further comprising:
generating the predicted frame using a frame reconstruction DNN with the fused aligned feature map as an input to the frame reconstruction DNN.

11. The method of claim 1, wherein the 4D tensor is formed by stacking the one or more previously reconstructed reference frames such that the 4D tensor includes a plurality of channels and a plurality of resolutions.

12. A method of neural network training, comprising:
inputting a set of reference frames to a predicted frame generation module to generate a predicted frame, the predicted frame generation module including neural networks having parameters that are to be optimized, the neural networks including a deformable convolutional deep neural network (DNN);
determining a loss of a loss function, the loss function including:
a compressive loss indicating a bitrate estimated based on a difference between the predicted frame and a ground-truth frame, and
a reconstruction quality loss indicating a quality of the predicted frame with respect to the ground-truth frame; and performing a back-propagation based on the loss of the loss function to update the parameters of the neural networks in the predicted frame generation module.

13. The method of claim 12, wherein the reference frames are selected from a sequence of frames in a video based on a temporal down-sampling operation, and a frame in the sequence of frames that is not selected by the down-sampling operation is used as the ground-truth frame.

14. The method of claim 12, wherein the loss function further includes an alignment loss indicating an alignment error, and
the method further comprises:
generating first feature maps corresponding to the reference frames, respectively, using a feature extraction deep neural network (DNN) in the predicted frame generation module,
generating second feature maps corresponding to the first feature maps, respectively, using the deformable convolutional DNN in the predicted frame generation module, and
determining a difference between one of the second feature maps and the first feature map corresponding to a target frame that is one of the reference frames input to the predicted frame generation module, the difference being part of the alignment loss.

15. The method of claim 14, wherein the target frame is the reference frame that neighbors the ground-truth frame when the ground-truth frame and the reference frames are arranged in display order.

16. The method of claim 12, further comprising:
generating a residual signal between the ground-truth frame and the predicted frame;
performing residual encoding and decoding subsequently to the residual signal to generate a reconstructed residual signal;
combining the ground-truth frame with the reconstructed residual signal to generate a reconstructed reference frame; and
including the reconstructed reference frame into the set of reference frames.

17. A non-transitory computer-readable medium storing instructions that, when executed by a processor, cause the processor to perform a method of video coding, the method comprising:
generating a first feature map using a feature extraction deep neural network (DNN) based on one or more previously reconstructed reference frames, the first feature map including one of a two-dimensional feature map, a three-dimensional feature map, or a four-dimensional (4D) feature tensor that is generated based on an input of a 4D tensor formed by the one or more previously reconstructed reference frames;
performing a deformable convolution through a deformable convolutional DNN to generate a second feature map based on the first feature map;
generating a predicted frame based on the second feature map; and
reconstructing a current frame based on the predicted frame.

18. The non-transitory computer-readable medium of claim 17, wherein the method further comprises:
generating an offset map corresponding to the first feature map using an offset generation DNN, the offset map being generated based on a difference between each frame of the one or more previously reconstructed reference frames and a target frame that is determined in the one or more previously reconstructed reference frames.

19. The non-transitory computer-readable medium of claim 18, wherein the target frame neighbors the current frame when the current frame and the one or more previously reconstructed reference frames are arranged in a display order.

20. The non-transitory computer-readable medium of claim 18, wherein:
   the target frame is a last frame of the one or more previously reconstructed reference frames when the current frame is a P frame, and
   the target frame is a last frame of a subset of the one or more previously reconstructed reference frames that are prior to the current frame in a display order when the current frame is a B frame.

\* \* \* \* \*